(12) United States Patent
Andelman

(10) Patent No.: US 6,628,505 B1
(45) Date of Patent: Sep. 30, 2003

(54) FLOW-THROUGH CAPACITOR, SYSTEM AND METHOD

(75) Inventor: Marc D. Andelman, Worcester, MA (US)

(73) Assignee: Biosource, Inc., Worcester, MA (US)

( * ) Notice: Subject to any disclaimer, the term of this patent is extended or adjusted under 35 U.S.C. 154(b) by 0 days.

(21) Appl. No.: 10/049,872

(22) PCT Filed: Jul. 29, 2000

(86) PCT No.: PCT/US00/20768

§ 371 (c)(1),
(2), (4) Date: Feb. 12, 2002

(87) PCT Pub. No.: WO01/13389

PCT Pub. Date: Feb. 22, 2001

(51) Int. Cl.⁷ ................................................. H01G 4/228
(52) U.S. Cl. ...................................... 361/541; 361/302
(58) Field of Search ............................... 361/302, 306.1, 361/328, 511, 512, 519, 522, 541, 537; 204/665, 671; 210/198.2, 243, 541, 656

(56) References Cited

U.S. PATENT DOCUMENTS

| | | | |
|---|---|---|---|
| 3,658,674 A | 4/1972 | Benak | |
| 5,192,432 A | 3/1993 | Andelman | |
| 5,196,115 A | 3/1993 | Andelman | |
| 5,200,068 A | 4/1993 | Andelman | |
| 5,360,540 A | 11/1994 | Andelman | |
| 5,415,768 A | 5/1995 | Andelman | |
| 5,425,858 A | 6/1995 | Farmer | |
| 5,538,611 A | 7/1996 | Otowa | |
| 5,547,581 A | 8/1996 | Andelman | |
| 5,620,597 A | 4/1997 | Andelman | |
| 5,636,437 A | 6/1997 | Kaschmitter et al. | |
| 5,748,437 A | 5/1998 | Andelman | |
| 5,779,891 A * | 7/1998 | Andelman | 210/198.2 |
| 5,793,603 A | 8/1998 | Lyman | |
| 5,925,230 A | 7/1999 | Fajt et al. | |
| 5,954,937 A | 9/1999 | Farmer | |
| 5,977,015 A | 11/1999 | Fajt et al. | |
| 5,980,718 A | 11/1999 | Van Konynenburg et al. | |
| 6,045,685 A | 4/2000 | Fajt et al. | |
| 6,096,179 A | 8/2000 | Fajt et al. | |
| 6,309,532 B1 | 10/2001 | Tran et al. | |
| 6,346,187 B1 | 2/2002 | Tran et al. | |
| 2002/0017463 A1 | 2/2002 | Merida-Donis | |

FOREIGN PATENT DOCUMENTS

| | | |
|---|---|---|
| WO | WO 98/11767 | 3/1998 |
| WO | WO01/89656 A1 | 11/2001 |
| WO | WO01/89671 A1 | 11/2001 |
| WO | WO01/90443 A1 | 11/2001 |
| WO | WO01/90444 A1 | 11/2001 |
| WO | WO01/96245 A1 | 12/2001 |

* cited by examiner

Primary Examiner—Anthony Dinkins
(74) Attorney, Agent, or Firm—Leslie Meyer-Leon, Esq.; IP Legal Strategies Group P.C.

(57) ABSTRACT

A flow-through capacitor and fluid for the purification system wherein the flow-through capacitor comprises a plurality of individuals, electrolyte-isolated cells (7), and the cells are electrically connected in series in a cartridge holder.

27 Claims, 6 Drawing Sheets

FLOW-THROUGH CAPACITOR, SYSTEM AND METHOD

REFERENCE TO PRIOR APPLICATION

This application is the national stage of PCT/US00/20768, filed Jul. 29, 2000, which is based on and claims priority from U.S. Provisional Patent Application Serial No. 60/148,885, filed on Aug. 13, 1999, each being hereby incorporated by reference.

BACKGROUND OF THE INVENTION

Flow-through capacitors are represented in Andelman U.S. Pat. No. 5,192,432, issued Mar. 9, 1993; U.S. Pat. No. 5,196,115, issued Mar. 23, 1993; U.S. Pat. No. 5,200,068, issued Apr. 6, 1993; U.S. Pat. No. 5,360,540, issued Nov. 1, 1994; U.S. Pat. No. 5,415,768, issued May 16, 1995; U.S. Pat. No. 5,547,581, issued Aug. 20, 1996; U.S. Pat. No. 5,620,597, issued Apr. 15, 1997; U.S. Pat. No. 5,779,891, issued Jul. 14, 1998; Otowa U.S. Pat. No. 5,538,611, issued Jul. 23, 1996; Farmer U.S. Pat. No. 5,425,858, issued Jun. 20, 1995; and Benak U.S. Pat. No. 3,658,674, issued Apr. 25, 1972. These patents all describe flow-through capacitors that electrically comprise a single electric cell per cartridge holder. Scale up to larger size causes these capacitors to draw high amperage power. High amperage power requires extra thick wires and buss bars and expensive power supplies. Therefore, a need exists for a flow-through capacitor which can utilize less expensive, more economical, higher voltage, lower amperage power for a given watt rating.

The aforementioned prior art patents describe single cell capacitors with one cell per cartridge holder, utilizing multiple, parallel-connected anode and cathode layers per cell. A cell comprises at least one anode and cathode layer with an ionically conducting electrolyte that operates within the rated cell voltage. This rated voltage is usually set below the level where electrode deterioration takes place or other undesirable electrochemical reactions occur. Where multiple electrode layers exist, these layers are usually connected in parallel. In the flow-through capacitor, this electrolyte is the working fluid that is being treated. In order not to exceed the rated voltage per cell, this fluid must be electrically isolated from the fluid in any other cell. In order to electrically connect prior art capacitors in series, individual flow-through capacitor cartridge holders must be chained together. Fluid flow and electricity must be distributed equally between cells, so that the individual cell voltages do not become unbalanced. This often requires that each cell be individually monitored and controlled. For example, FIG. 15 of Andelman U.S. Pat. No. 5,799,891 pictures a flow-through capacitor system with three flow-through capacitors in individual cartridge holders. Each cartridge holder contains one cell, typically made from multiple, parallel-connected electrodes. Use of an additional cartridge holder per cell increases the cost of series-connected, flow-through capacitors that comprise multiple cells, yet are self-contained in one cartridge holder. Also, a need exists for a series-connected, flow-through capacitor that can operate at voltages higher than that of a single cell, yet within a single cartridge holder, where the individual cells are electrically isolated from one another.

Otowa U.S. Pat. No. 5,538,611 and Farmer U.S. Pat. No. 5,425,858 both utilize gaskets to isolate the fluid flow path. Otowa utilizes single electrode layers sealed by a gasket. However, Otowa does not use double-sided electrodes to provide a capacitor of enhanced voltage internal to a single cartridge holder. Farmer utilizes gaskets and many double-sided, internal electrode layers, but these layers are connected in parallel.

SUMMARY OF THE INVENTION

The invention relates to a flow-through capacitor, system and method.

It is desirable to provide a series-connected, flow-through capacitor to allow the use of more energy and cost efficient electrical power within a single, easy to manufacture cartridge.

The invention is also related to a series-connected, flow-through capacitor with multiple individual electrolyte-isolated cells and which capacitor is self-contained in a single cartridge holder.

An additional advantage of the present invention is that only the electrical leads at the either end of the electrode stack need be connected to a power supply, yet voltage may be higher than the single cell rating.

The invention comprises a flow-through capacitor for the purification of an electrolyte fluid, which capacitor includes: a cartridge holder; an inlet in the holder for a fluid to be purified; an outlet in the holder for the withdrawal of a purified fluid; a discharge outlet; and a plurality of electrolyte-isolated individual cells, each cell composed of an anode-cathode pair of electrode material in a stacked arrangement within the holder, and the individual cells are electrically connected in series.

In the present invention, the electrodes of the capacitor are series-connected, due to sealing gasket, so that the intermediate electrodes of the capacitor simultaneously comprise an anode on one side and a cathode on an other side.

The invention will be described for the purpose of illustration only in connection with certain illustrated embodiments; however, it is recognized that various changes, modifications, additions, and improvements may be made in the illustrative embodiments without departing from the spirit or scope of the invention.

DESCRIPTION OF THE EMBODIMENTS

Figure 1:
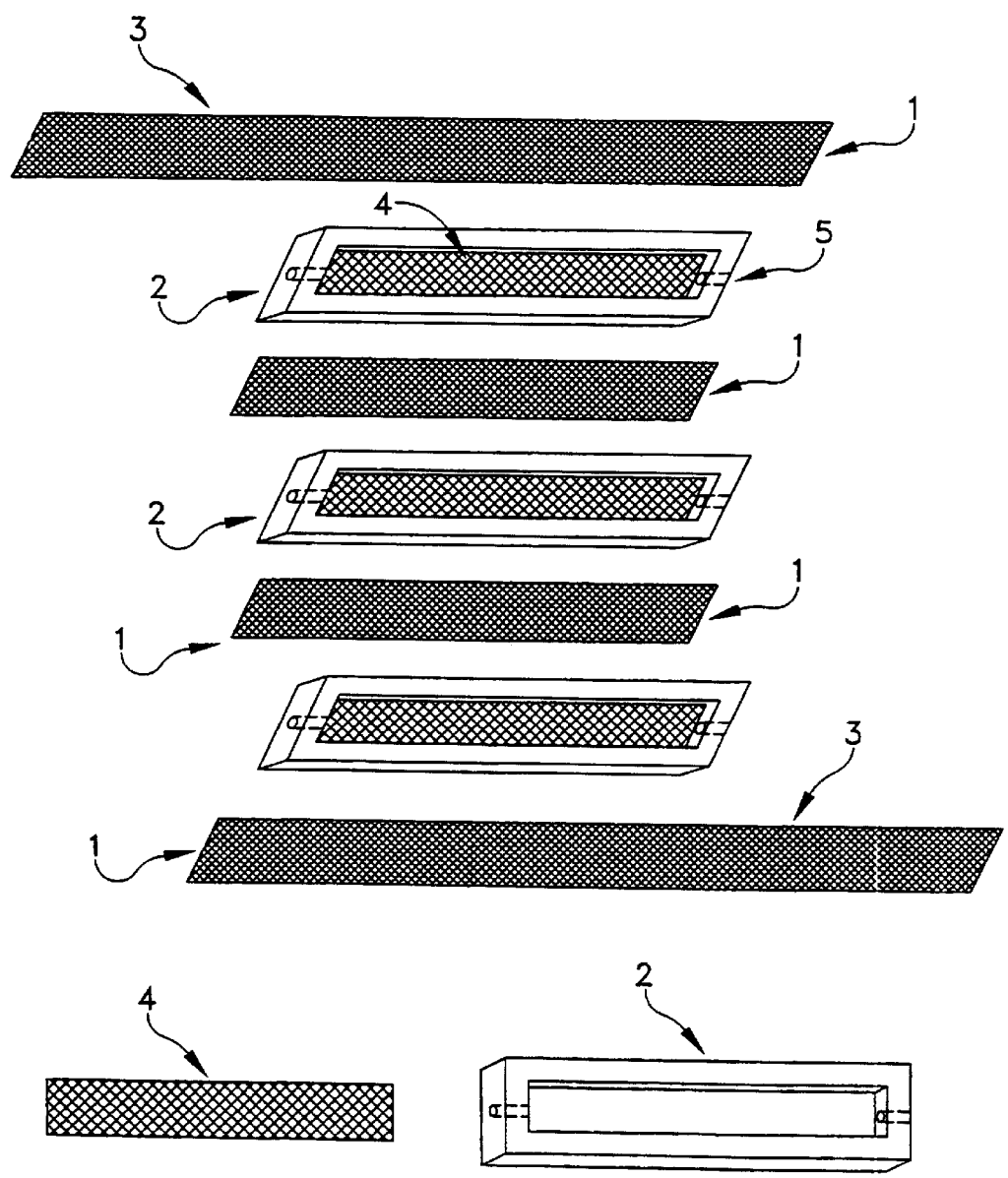
FIG. 1 is an exploded perspective view of the electrode layers and gaskets of the invention to form series-connected cells.

FIG. 1 shows the arrangement of layers and gaskets used to isolate the electrodes, in order to utilize both sides of the electrodes 1, yet form cells with single facing anode and cathode layers per cell. The end electrodes are single-sided and may be exposed to the air to form the top fluid seal of the cartridge holder. This method of construction allows the electrical isolation of individual cells by using the electrode or optional current collector in combination with gaskets 2 to form a fluid-tight compartment, whereby the electrolyte from each cell is electrically isolated from the neighboring cells. End electrodes may be drawn out into a lead 3. Gaskets 2 may have an optional nonelectrical conductive, but ionically-conductive spacer layer 4. Gaskets may have flow holes 5.

Figure 2:
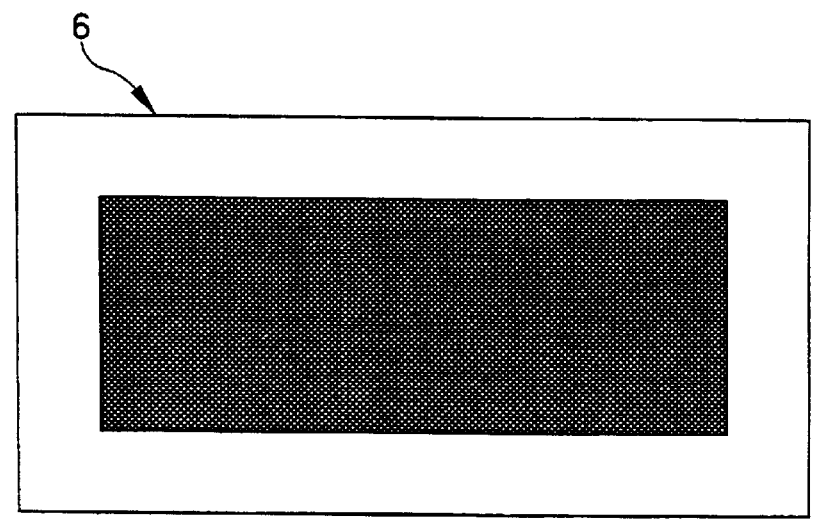
FIG. 2 shows top plan and side views of individual electrodes and current collectors.
Figure 2:
Figure 2:
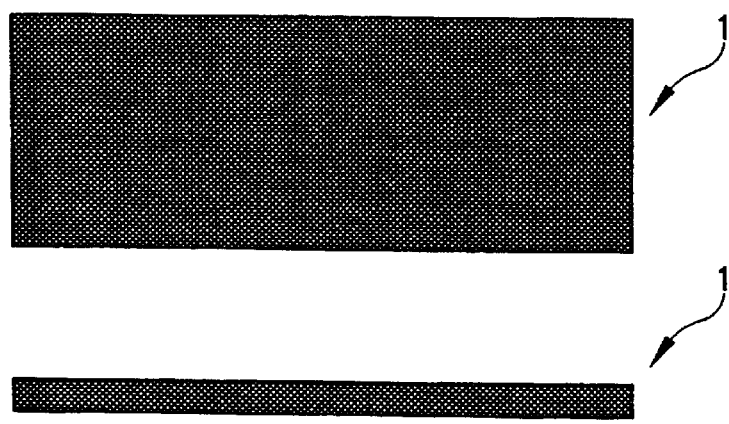

FIG. 2 shows the individual electrodes 1 and the optional current collectors 6.

Figure 3:
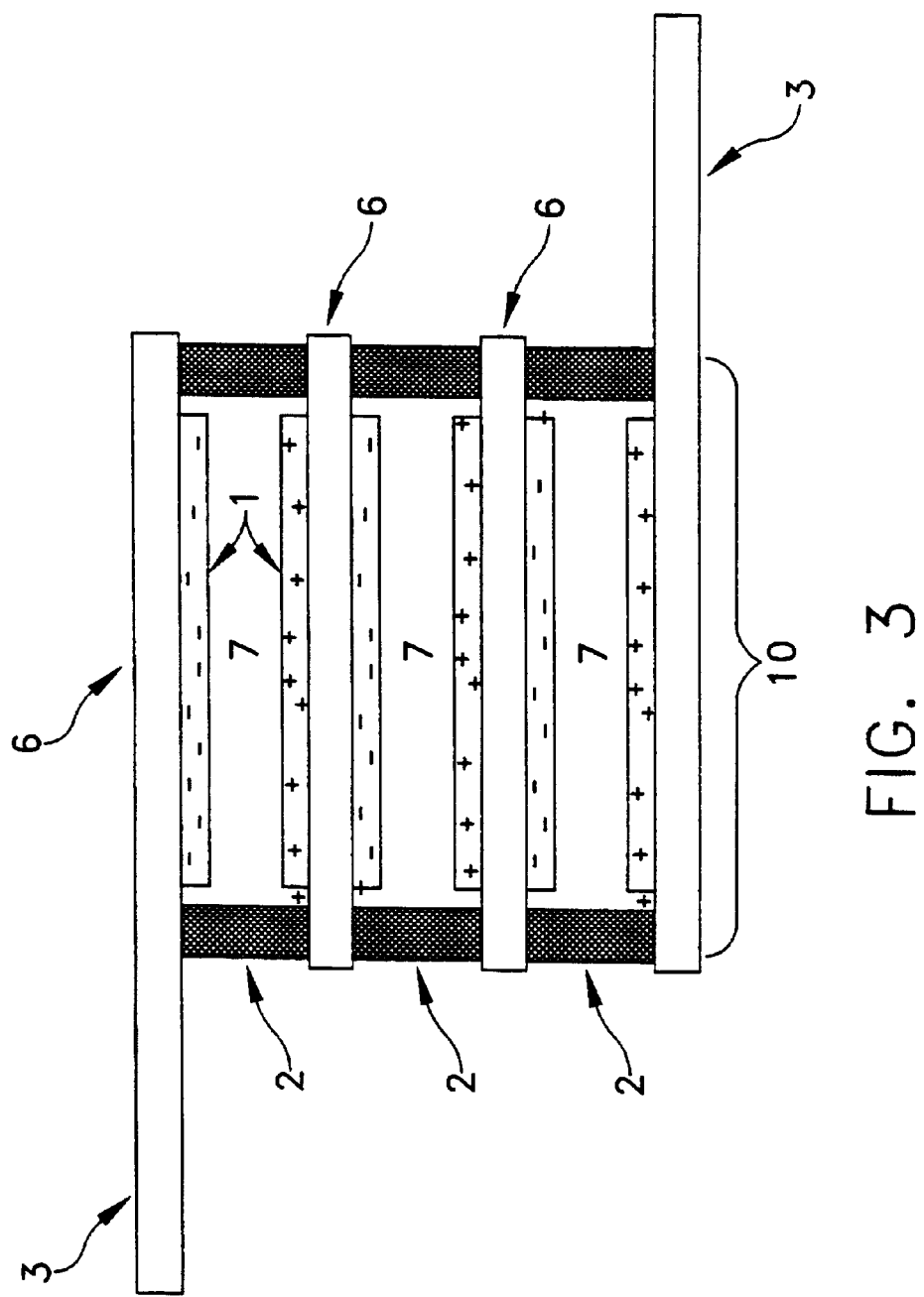
FIG. 3 schematically illustrates a charged capacitor of the invention with individual cells.

FIG. 3 shows individual cells 7 formed electrostatically when the capacitor is charged. Gaskets 2 seal against the optional current collector 6 or directly to the conductive material used for electrodes 1. The end electrodes 1 are single-sided, and the internal electrodes 1 are double-sided. However, from the electrical point of view of each, all the electrodes 1 are single-sided, providing only one anode and one cathode layer per each individual electrical cell. In the prior art, double-sided electrodes were either an anode or cathode, but not an anode on one side and a cathode on the other side, as in the present invention. Each electrode 1, however, may be represented by multiple parallel electrodes, in order to provide thicker cells with better flow properties, yet while maintaining a capacitor that operates at enhanced voltage within a single capacitor cartridge holder. The cartridge holder is formed by the gaskets or may be an additional holder into which with gasket assembly of FIG. 3 fits. Once a flow-through capacitor stack 8 is built that has the proper voltage and flow characteristics, this may be used as modules, and in turn, be further connected together, both electrically and in a fluid flow sense, either in series or parallel, or in any combination thereof. For example, several stacks may be connected electrically in parallel, yet the fluid flow may be in series.

Conductive material may be a high surface area conductor greater than 1000 grams per square meter B.E.T. or a high specific capacitance, yet low surface area material, e.g., 10 to 1000 grams per square meter B.E.T. or may be any conductive material, such as titanium, tantalum, and graphite coated with ruthenium oxide or ruthenium oxide, fluorocarbon fiber sheet material, without regard to surface area when used, for example, to remove contaminants via electroplating instead of electrostatic absorption.

Enhanced voltage through connection in series also aids in energy recovery by allowing the use of more energy efficient, higher voltage DC to DC converts. To do this, two capacitors are operated in tandem. One charges with electricity and purifies the solution and the other discharges while it desorbs a concentrated waste. When a flow-through capacitor is ready to be regenerated, it is electrically discharged. This energy can be recovered and used to charge another capacitor during its charge/purification cycle. In order to do this, the voltage of the discharging cell must be increased, so that it may be sufficiently high to charge the purifying capacitor. This may be done with DC to DC converters. These may use, for example, inductor coils or transformers, in order to increase and regulate the voltage. Use of DC to DC converters may also be used in any flow-through capacitor, either parallel, individual cells connected in series or the series design of the present invention.

Figure 4:
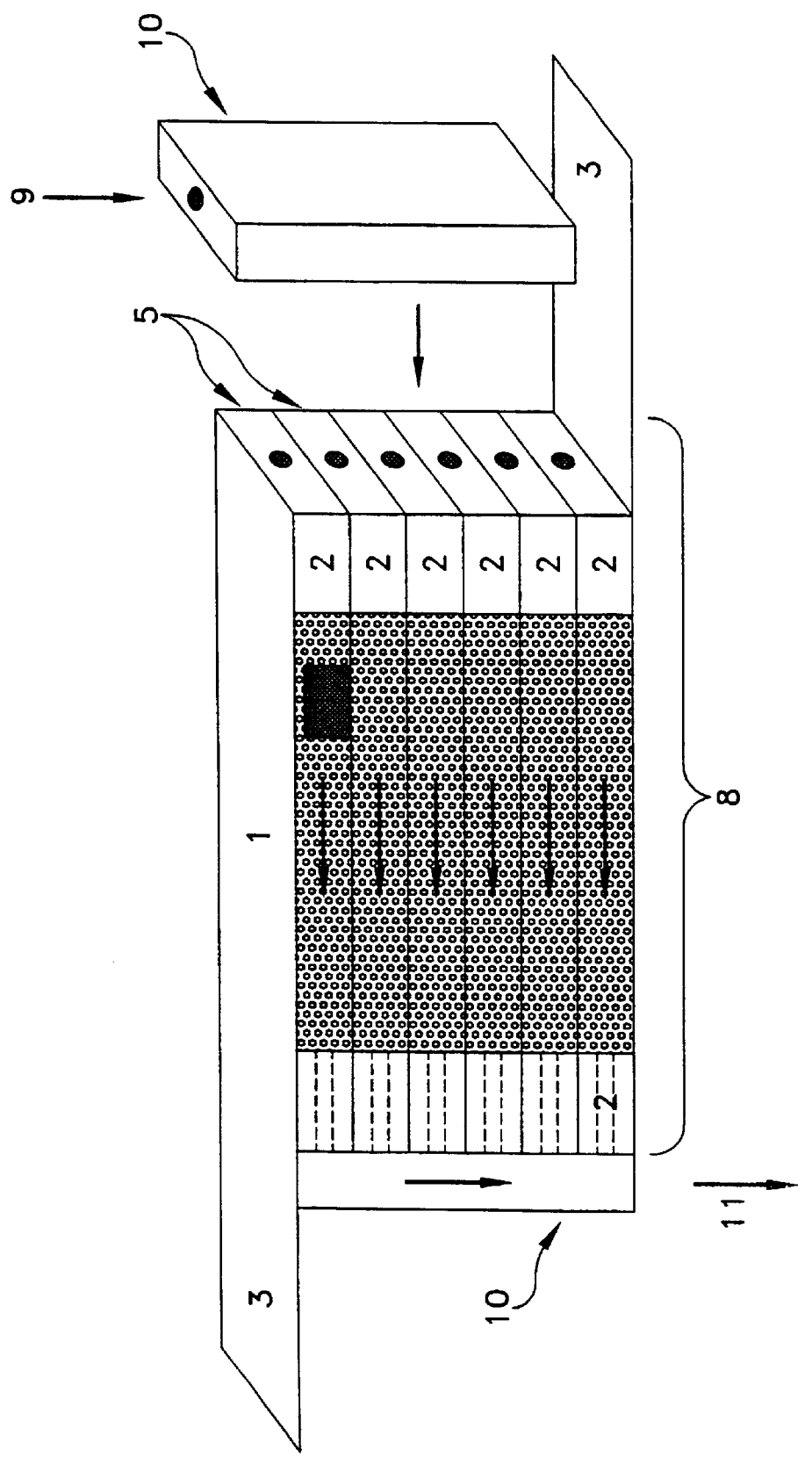
FIG. 4 is a schematic, perspective sectional view of a flow-through capacitor stack of the invention.

FIG. 4 shows an assembled capacitor stack 8, cut lengthwise down the middle, comprised of six cells. The flow-through capacitor of the invention may be comprised of any number of cells, but from a practical standpoint, is usually less than two hundred cells. Each individual cell has to be similar in size in order to balance the voltage. Flow rates and amounts of material purified should match between each cell as much as possible and in order to keep the voltage balanced between the cells. Flow, shown by an arrow, is through inlet 9, into fluid flow baffle 10, through individual gasket holes 5 and out baffle 10 and exit 11 (hole not shown). Gaskets 2 seal each individual cell 7, so that an electrically conductive path does not form between cells 7 through the electrolyte represented by the working solution. The purpose of baffle 10 is to distribute flow between each cell, yet provides a long conductive path length through the electrolyte between the cells. This long path through the electrolyte between cells 7, holes 5, and electrical path in baffles 10 has a high resistance and serves to electrically isolate the individual cells 7. Baffle 10 may contain a serpentine flow path or other means, in order to lengthen the flow path between cells, so that the resistance is low enough to prevent significant current flow between cells. Generally, this flow path should be long enough and thin enough, so that the electrical resistance is more than 1 ohm and preferably, more than 100 ohms.

Figure 5:
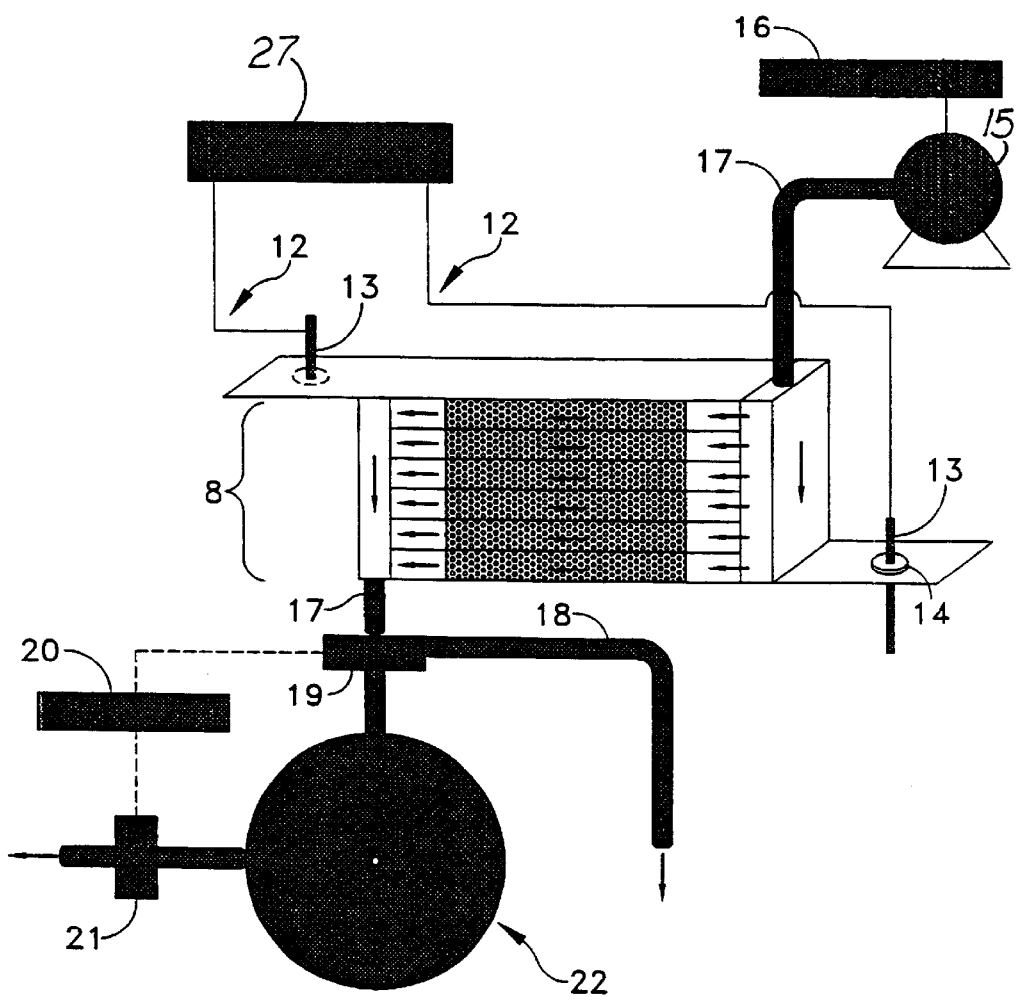
FIG. 5 is a schematic illustration of a flow-through capacitor system of the invention.

FIG. 5 is a flow-though capacitor system of the invention with power supply 27 connected via wires 12 to capacitor stack 8 via screw 13, nut and bolt assembly 14, and extending leads 3. Alternatively, wires may be welded, if appropriate, for the particular material involved. Pump 15 controlled by logic means 16 pumps the working fluid to be treated or purified through inlet pipe 17 and out concentrated waste product pipe 18, which is connected to three-way valve 19, controlled by combination valve controller, electronic logic means 16 to control the operation of the system and electric conductivity sensor 20 to monitor ionic concentration of the purified liquid, which also controls outlet valve 21. Bladder tank 22 serves to store the purified solution and maintain pressurization.

Figure 6:
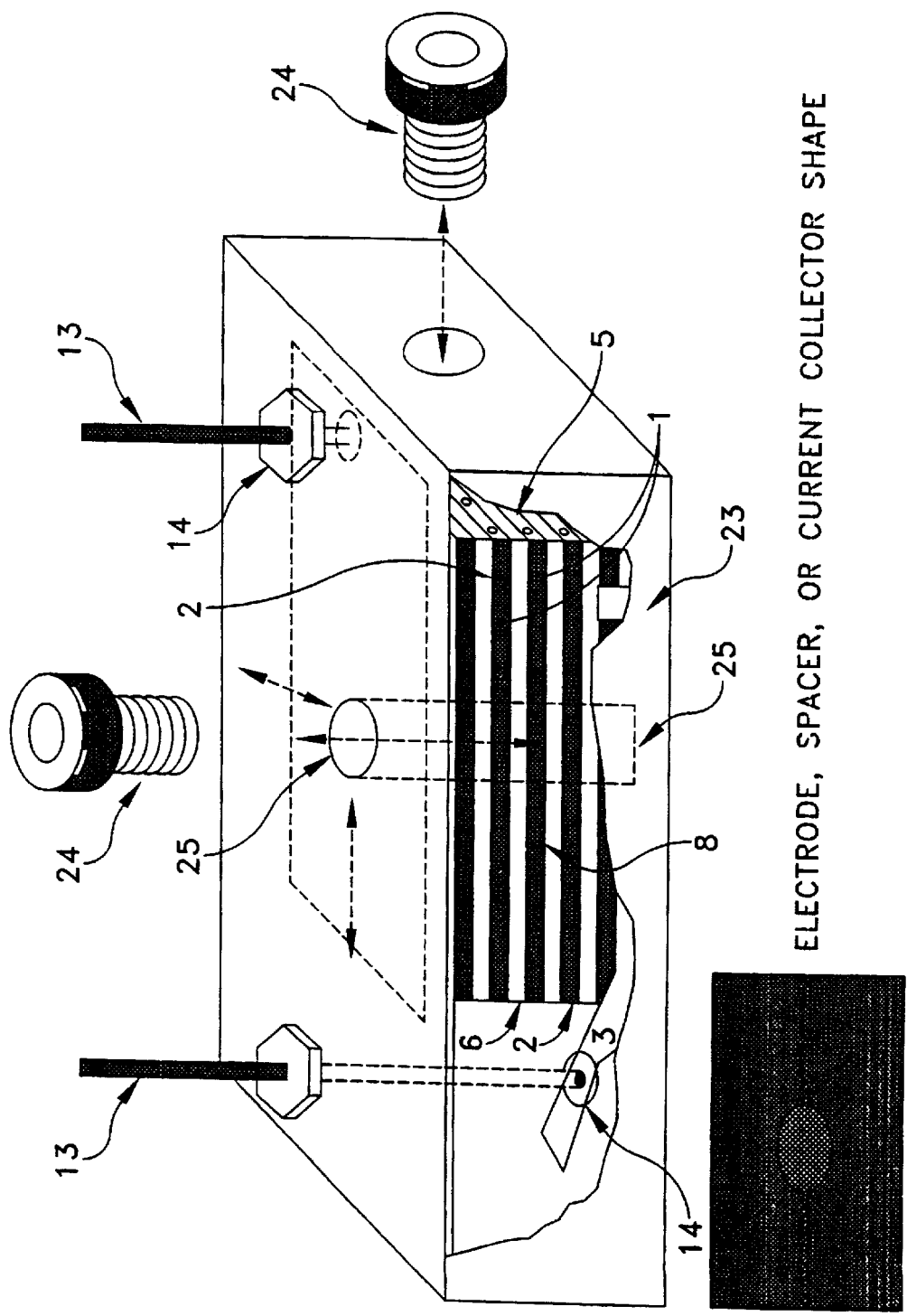
FIG. 6 is an illustrative perspective sectional view of a flow-through capacitor of the invention with an illustrated plan view of an electrode, spacer, or current collector shape.

FIG. 6 shows a central flow design capacitor. It is understood that any design which allows an equal fluid flow between cells, yet isolates individual cell compartments, may be used to make an enhanced voltage series, flow-through capacitor. For example, FIG. 6 shows a design with a central flow path. Capacitor stack 8 is placed inside cartridge holder 23. Fluid flow is in through one of the inlets/outlets 24 and out the other one. Flow may be from the side, around the capacitor stack 8, through the holes 5, in gaskets 2, alongside electrode layers 1, and out central flow path 25. The central flow path 25 is formed by central holes in the electrode, optional current collector 6 and spacer layer 4 (not shown). The end single-sided electrode 1 is extended to form an anode or cathode lead 3 on each side. Screw 13 extends through cartridge holder 23 to form an electrical connection and leak-proof seal with lead 3, by washer and screw means 14. Baffle means 10 (not shown) may be inserted into the central flow path 25, in order to provide a long, thin cross-sectional flow path to isolate cells 7 with a high resistance electrical connection between cells 7. For example, a spiral flow path baffle that forces fluid to spiral flow into the center of the tube will provide such a flow path. Air bubbles or air gaps will also serve to isolate individual cells, yet allow fluid to flow and distribute evenly between cells.

EXAMPLE 1

Wastewater from a semiconductor plant is neutralized and fed into a 10 cell capacitor stack of the invention at a rate of 1 gallon per minute. The capacitor is made from ruthenium-coated, tantalum-conductive, ceramic electrodes connected to a 10 volt power supply. These electrodes are integral to the current collector, so they do not need an additional current collector. The capacitor is initially charged at 4 volts for the first minute, then at 10 volts after 1 minute. Corn syrup purified from ash is collected in a collection tank.

During regeneration, the electrodes are short-circuited in order to desorb the concentrated waste into the water, which is disposed of down the drain.

EXAMPLE 2

A 20 cell, flow-through capacitor made from 20 cells of activated carbon cloth and graphite foil current collector is used to purify whey at 1 gallon per minute, connected to a 40 volt power supply. Desalted whey is collected in a container. During regeneration, the whey is replaced with water, and the electrodes are short-circuited in order to desorb the concentrated waste into the water, which is disposed of down the drain.

EXAMPLE 3

A 5 cell, flow-through capacitor made from aligned nanotubes is used to purify sulfate from well water at 2 volts. The voltage per cell is 0.4 volts.

EXAMPLE 4

A 100 cell, electrode stack made from copper foil is used to purify plating waste containing 20 ppm nickel metal. The stack is run at 20 volts or 0.2 volts per cell. Nickel metal plates onto the stack allow purified water to pass through. The electrodes in this capacitor are fairly stiff and do not require any spacer to prevent short-circuiting beyond the gasket material. After repeated uses, the old electrodes are replaced and sent to a smelter for recovery.

EXAMPLE 5

The capacitor of Example 4 is manufactured with activated carbon cloth electrodes. Instead of replacing the electrodes, they are acid-washed in order to recover the metal in a concentrated acid solution. The cleaned electrodes may then be used in another purification cycle. Polarity is reversed every charge cycle, in order to help keep the electrodes clean.

What is claimed is:

1. A flow-through capacitor comprising:
   a) an inlet for allowing an electrolytic fluid to enter said capacitor and an outlet for allowing said fluid to exit said capacitor; and
   b) a plurality of flow-through capacitor cells electrically connected in series, each cell of said cells comprising an electrode material and an electrolytic fluid in fluid communication with the inlet and the outlet, the electrolytic fluid of each cell of said cells being electrically isolated from the electrolytic fluid of each of the other of said cells.

2. The flow-through capacitor of claim 1, wherein said flow-through capacitor has a single cell voltage rating, the rating being below the level at which undesirable electrochemical reactions or electrode deterioration will occur, and said flow-through capacitor has a total voltage that is greater than said single cell voltage rating.

3. The flow-through capacitor of claim 2, wherein the voltage is distributed between the cells so as to balance voltage between the cells, so that each cell of said cells does not exceed the single-cell voltage rating.

4. The flow-through capacitor of claim 2, wherein the electrolytic fluid of each cell is electrically isolated from the electrolytic fluid of each other cell by resistance.

5. The flow-through capacitor of claim 1, wherein each cell is similar in size so as to balance the voltage between cells.

6. The flow-through capacitor of claim 1, wherein at least two of said plurality of cells is contained within a housing to form a flow-through capacitor cartridge.

7. The flow-through capacitor of claim 1, further comprising a discharge outlet.

8. The flow-through capacitor of claim 1, wherein said flow-through capacitor comprises two end electrodes and one or more intermediate electrodes.

9. The flow-through capacitor of claim 8, wherein the intermediate electrodes are double-sided electrodes.

10. The flow-through capacitor of claim 8, wherein the intermediate electrodes comprise an anode on one side and a cathode on the other side.

11. The flow-through capacitor of claim 1, wherein said electrode material is in a stacked arrangement within the cell.

12. The flow-through capacitor of claim 11, wherein the stacked arrangement is characterized by a generally central, flow-through hole in the stacked electrode material.

13. The flow-through capacitor of claim 1, wherein the plurality of cells are in a stacked arrangement within the capacitor.

14. The flow-through capacitor of claim 1, wherein an individual electrode is drawn into a lead.

15. The flow-through capacitor of claim 1, wherein the electrolytic fluid flows through an inlet into a baffle and said baffle distributes the fluid flow between each cell of said cells.

16. The flow-through capacitor of claim 1, wherein the electrolytic fluid has an electrical resistance of 1 ohm or more.

17. The flow-through capacitor of claim 1, comprising a gasket between neighboring cells.

18. The flow-through capacitor of claim 1, wherein the electrode material is selected from the group consisting of ruthenium oxide, activated carbon cloth, conductive metal foil, and metal conductive foil material coated with conductive particulate material.

19. The flow-through capacitor of claim 1, wherein at least one of the series connected cells comprises a plurality of electrodes electrically connected in parallel.

20. The flow-through capacitor of claim 1, wherein the intermediate electrode forms individual cells with a single facing anode on one side and a cathode on the other side of each cell.

21. A capacitor system which comprises a plurality of the capacitor of claim 13, the capacitors being electrically connected in parallel and being fluidly connected in series.

22. A capacitor system which comprises:
   a) a first capacitor of claim 1;
   b) a second capacitor of claim 1, which is flow-connected in tandem with the first capacitor;
   c) a direct current-direct current (DC—DC) converter, transformer, or coil electrically connected to the first and second capacitors to recover energy from the discharge of the capacitor; and
   d) a power supply whereby, when the capacitor is connected to a power supply in a cyclic operation, the first capacitor is charged and purifies a fluid from which the second capacitor is electrically discharged and absorbs a concentrated waste from the fluid, and the converter receives the electrical discharge from the second capacitor and increases the discharge voltage and charges the first capacitor.

23. A capacitor system which comprises:
a) the capacitor of claim 1;
b) a power supply for the capacitor;
c) a source of fluid to be introduced into said capacitor to be purified;
d) a storage tank to receive purified fluid from the outlet and to maintain pressure in the system;
e) a conductivity sensor to monitor ionic concentrations of the purified fluid; and
f) a valve to control the flow of the fluid in the system.

24. The capacitor system of claim 23, further comprising a logic means to control the operation of the system responsive to the sensor.

25. A capacitor system in which the capacitor of claim 13 is a module unit, wherein said system comprises a plurality of said module units electrically and fluid flow connected for purification of a fluid.

26. A method for removing a contaminant from an electrolyte fluid, which method comprises:
a) introducing the fluid into an inlet of the flow-through capacitor of any one of claims 13–25;
b) withdrawing a purified fluid from an outlet of the capacitor;
c) discharging concentrated waste contaminants from a waste outlet of the capacitor; and
d) passing the fluid through a plurality of electrolyte-isolated individual cells, each cell composed of an anode-cathode pair of electrode material in a stacked arrangement within a holder, and the individual cells electrically connected in series.

27. A capacitor system comprising the flow-through capacitor of claim 1, a power supply to provide voltage, and a means for balancing said voltage between said cells.

\* \* \* \* \*